July 11, 1933.  A. C. DRESHER  1,917,704
SYSTEM AND APPARATUS FOR TREATING LIQUID
Filed Dec. 27, 1929
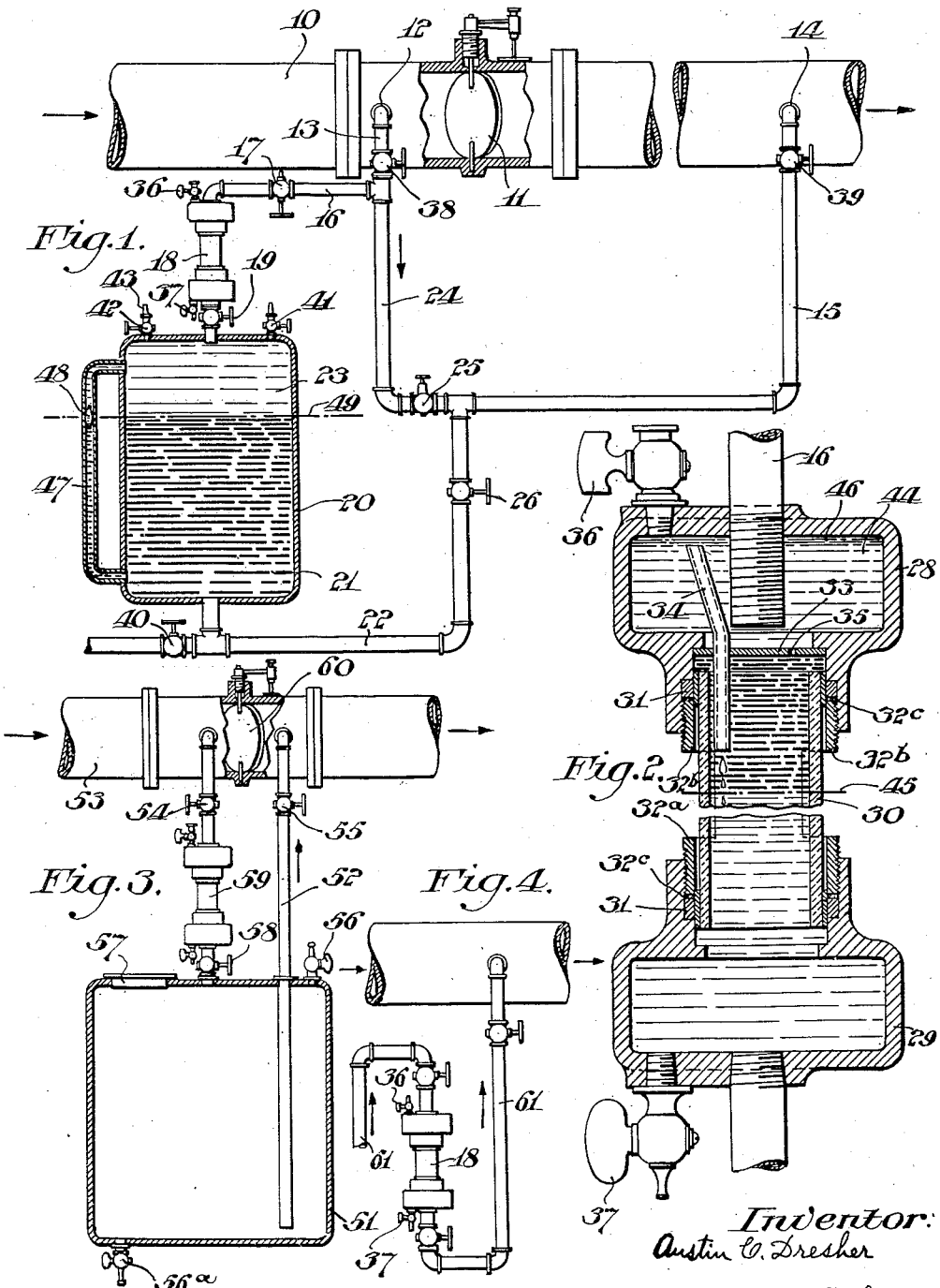
Inventor:
Austin C. Dresher
By Cornelius D. Ehret
his Attorney Patented July 11, 1933

1,917,704

UNITED STATES PATENT OFFICE

AUSTIN C. DRESHER, OF PHILADELPHIA, PENNSYLVANIA, ASSIGNOR TO COCHRANE CORPORATION, OF PHILADELPHIA, PENNSYLVANIA, A CORPORATION OF PENNSYLVANIA

SYSTEM AND APPARATUS FOR TREATING LIQUID

Application filed December 27, 1929. Serial No. 416,931.

My invention relates to improvements in systems and apparatus for controlling liquid-flow, and particularly for controlling the rate of flow of one liquid, as a solution of chemical, proportional to the rate of flow of another liquid, as raw water to be treated.

In supplying boilers, swimming pools, etc., with water from a supply source containing impurities in the form of salts in solution and/or matter in suspension, it is common practice to first treat the raw water with a suitable chemical in solution to precipitate the undesirable chemical in the raw water, and to filter out the precipitant as well as any other matter which might be present in suspension. For this purpose, it has been the practice heretofore to feed the water-softening chemical to the raw water by the displacement principle, the apparatus consisting generally of a closed tank containing the chemical in solution and having an outlet connection into the raw water supply line, and an inlet connection including a needle or other suitable valve for admitting water at the desired rate from the supply line to the tank to displace the chemical therefrom and force the same into the supply line at a rate equal to the rate of flow by volume through the controlling needle or other valve. The inlet and outlet connections for the tank referred to are connected to the raw water supply line at points therein on opposite sides of an orifice plate or restricting orifice or suitably adjustable valve means providing a suitable differential pressure between the two connections whereby displacing water enters the chemical tank at a rate proportional to the feed of raw water, and the direction of flow in the inlet connection referred to is from the supply line at a point therein on the high-pressure side of the restricting orifice or valve means to the tank, and the direction of flow in the outlet or discharge connection referred to is from the tank to the supply line at a point therein on the low-pressure side of the restricting orifice or valve means.

In these systems used heretofore, conditions are commonly such that the chemical supply tank is emptied in approximately a 12-hour period, or in other words, the chemical solution in the tank is displaced therefrom in a 12-hour period by water taken from the stream of raw water to be treated and subsequently filtered. The capacity of the chemical-supply tank is generally from 1 to 20 cubic feet, depending upon conditions and requirements. For satisfactory and efficient operation of these systems, the needle or other valve controlling flow of the displacing water from the raw water supply line into the chemical-supply or chemical-feed tank must be very nearly closed so that the chemical-feed tank is emptied in approximately the 12-hour period or other period consistent with conditions such as capacity of the tank, strength of the chemical, volume of water to be treated per unit of time, etc. On account of this fine adjustment of the control valve, the same is occasionally completely closed by accumulation of sediment or foreign matter between the valve and its seat, which condition makes the system inoperative and shuts off the supply of chemical to the raw water supply line. Heretofore in the operation of such systems there has been no way of quickly ascertaining or observing whether the system was operating properly and the chemical-feed taking place at the proper rate, the result being that a considerable period of the time has elapsed before the operator has been aware that the chemical-supply has been shut off entirely or partially to prevent chemical-feed at a sufficient rate. To guard against this, the practice sometimes has been to open the controlling needle valve wider than necessary to lessen the chance of the valve opening being sealed by accumulation of sediment or other foreign matter. Such practice has not only been wasteful because the chemical is then fed to the raw water at a rate greater than that necessary for proper treatment thereof, but aside from this, has not entirely eliminated the possibility of the valve opening becoming closed or partly so.

One of the objects of the present invention, therefore, is to provide an improved system and apparatus of the general character referred to in which flow of the chemical-displacing water can be safely controlled between any desired limits to effect feeding of the chemical at any desired rate, and in which the displacing water itself can be visibly observed by the operator on its way to the chemical-feed tank so that the operator, by observing the displacing water and noting the rate of flow of the same to the tank, can ascertain if the system is operating properly, and is immediately informed when the system becomes inoperative or is functioning improperly due to complete or partial closure of the control valve by sediment, or for other cause.

In accordance with my invention, indicating means are disposed in and form part of the inlet connection referred to between the raw water supply line and the chemical-feed tank so that the displacing liquid on its way to the tank can be visibly observed by the operator.

Further in accordance with my invention, a substantially vertically-disposed transparent tubular member is disposed in and forms part of the inlet connection referred to whereby the chemical-displacing water from the raw water supply line is made to pass through this member on its way to the chemical-feed tank, the transparent member containing a liquid having a specific gravity less than that of the chemical-displacing water and being of such nature that the latter can be clearly distinguished from the former and observed as it passes through in the form of drops or globules.

Further in accordance with my invention, a substantially vertically-disposed transparent tubular member is disposed in and forms part of the inlet connection referred to and is partially filled with oil, whereby the chemical-displacing water coming from the raw water supply line by way of the controlling needle valve, passes downwardly through this member and can be clearly observed during its passage through the oil in the form of drops or globules.

My invention resides in a system and/or apparatus of the character hereinafter described and claimed.

For the purpose of illustrating my invention, several embodiments thereof are shown in the drawing, in which Figure 1 is a diagrammatic view of a system embodying the present improvements;

Fig. 2 is an enlarged elevational sectional view of apparatus forming part of the system in Fig. 1;

Fig. 3 is a view similar to Fig. 1, showing another system embodying the present improvements; and Fig. 4 is a fragmentary view, illustrating a modification.

Referring more particularly to Fig. 1, the raw water supply conduit 10, through which the water flows in the direction indicated by the arrows, is provided with a suitable restricting orifice or adjustable valve means 11 providing for the proper degree of restricted flow through the conduit such that there is a differential pressure condition between point 12 in the conduit at which connection 13 is made, and point 14 in the conduit at which connection 15 is made. Due to this differential pressure condition, a small proportional amount of the raw water is caused to flow through connection 13, connection 16, needle valve 17, an indicating device designated generally by reference numeral 18, valve 19, and thence into the top of the chemical-feed tank 20 to displace an equal volume of the chemical 21 whereby the same is forced through connections 22 and 15 and discharged into conduit 10 at the point 14. The chemical solution 21 has a specific gravity appreciably greater than that of the displacing raw water 23 coming from conduit 10. Part of the water flowing from conduit 10 by way of connection 13 flows through connection 24 and a suitable orifice 25 into mixture with the chemical being discharged into connection 15 from connection 22, the mixture then flowing through connection 15 into conduit 10. The design or adjustment of orifice 25 is such that the raw water is permitted to pass through the same at a rate sufficient to provide for proper dilution of the denser chemical solution issuing into connection 15 from connection 22.

The indicating apparatus 18 comprises a vertically-disposed casing made up of the end parts 28 and 29 and the interposed transparent tubular member or gage glass 30 having its ends received by parts 28 and 29, as shown, and provided with rubber washers 31 compressed between shoulders 32 and the ends of a tubular guard 32a threaded as shown into parts 28 and 29. The guard 32a is cut away on opposite sides thereof to provide the openings 32b through which the gage glass may be observed. Suitable metallic rings 32c, having a snug fit with respect to parts 28 and 29 and washers 31, may be interposed between the latter and the ends of guard 32a. A disc or plate 33 is disposed as shown in part 28 and has a press fit with respect thereto, the disc providing a partition between inlet connection 16 and the other part or end 29 of the casing. A tube 34, open at both ends, is carried by and extends through disc 33 and beyond both sides thereof, the upper end portion of the tube being bent laterally as shown to accommodate the adjacent end of inlet connection 16 beyond which it extends. Disc 33 is provided with the vent opening 35 for the purpose hereinafter explained, and the casing parts 28 and 29 are provided respectively with the valve or stop cock 36 and the drain valve or petcock 37.

For the purpose of filling feed tank 21, valves 26, 38 and 39 are first closed to shut off the supply of raw water to the chemical-feeding apparatus. Valve 19 is also closed. The drain valve 40 and the vent valve 41 are then opened. When tank 20 is completely drained, valve 40 is closed. The valve 42 is then opened to admit chemical solution to the tank at the proper pressure from a suitable supply connection 43. When the tank is full of the chemical solution, as shown by discharge of the solution from the petcock or vent valve 41, valves 41 and 42 are closed.

Valve 17 is now closed and valves 19, 36 and 38 opened.

Valve 17 is then opened to admit raw water from conduit 10 into the casing of device 18. The water first substantially fills chamber 44 in the casing part 28 and then passes downwardly through tube 34 into gage glass 30, casing part 29 and the short connection between the latter and the top of tank 20, during which time the displaced air is permitted to discharge to atmosphere by way of vent opening 35 and the open petcock or valve 36. When the device 18 is filled with the raw water, as shown by discharge of the same from valve 36, the needle valve 17 is closed. Valve 19 is also closed at this time.

Before the chemical-feeding equipment is placed in service, the indicating device 18 is charged with a one-to-one mixture of light machine oil and kerosene, or other liquid having a specific gravity different than that of the raw water. In the embodiment of the invention disclosed, the specific gravity of this mixture is slightly less than that of the raw water. For this purpose, the petcock or drain valve 37 is opened to permit water to drain slowly from the device, and at the same time the oil mixture is fed into the open petcock at a rate at least equal to the rate at which the water is being drained from the device. The oil enters chamber 44 until the upper end thereof contains the body of oil 46 extending downwardly to the upper end of tube 34, after which the oil begins to pass downwardly through this tube and from the lower end of the same. The oil, due to its lower specific gravity, rises upwardly in tube 30 and collects below partition 33. The feeding of oil into stopcock 36 and the accompanying draining of the device through petcock 37 is continued until a volume of oil has been taken in so that the oil extends downwardly in the gage glass from partition 33 to about the level 45. Petcocks 36 and 37 are then closed.

The chemical-feed tank is then placed in service by first opening valves 19, 26 and 39, and then opening the control valve 17. Raw water then enters chamber 44 from connection 16 and begins to flow downwardly through tube 34 and thence from the lower open end thereof in the form of drops or globules. These drops or globules of the raw water then pass downwardly through the oil and can be clearly observed due to the difference of viscosity and specific gravity between the oil and the water. Raw water is accordingly forced into tank 20 and displaces the chemical solution 21 at the desired rate, the rate being controlled by adjustment of control valve 11. The rate of chemical-feed, for a given adjustment of control valve 17, can be varied by adjustment of orifice valve 11 to change the differential pressure condition between points 12 and 14 in conduit 10.

When the operator observes that globules of the raw water are issuing from the lower end of tube 34 and passing downwardly through the oil, he is assured that chemical is being displaced from tank 20 and discharged into conduit 10 at the point 14. By noting the number of globules of raw water passing downwardly through the oil during a given time, the operator can ascertain approximately as to whether the chemical is being fed to conduit 10 at the desired rate.

Tank 20 is provided with a gage glass 47 containing a suitable densimeter bulb 48 which is designed to float in the chemical but to sink in raw water. The bulb 48 therefore follows downwardly with the level 49 of the chemical solution as the same is displaced by the raw water 23, and provides further indication to the operator as to the rate at which the chemical is being fed to conduit 10. This indication is not, however, as accurate as that provided by the indicating device 18. That is, the operator is informed immediately of cessation of chemical-feed when he observes that no drops or globules of water are passing downwardly through the oil in sight glass 30 of the indicating device, whereas the lowering of level 49 and the bulb 48 therewith takes place at such a low rate that a substantial period of time elapses before it becomes apparent that downward movement of the indicating bulb 48 has ceased due to some fault in the system such as sealing of valve 17 by sediment.

During operation of device 18 there is no appreciable tendency for the oil below partition 33 to pass upwardly through vent opening 35 into chamber 44 due to the viscosity of the oil, the small diameter of the vent opening, and also to the pressure of the raw water above partition 33. Satisfactory results have been obtained by making vent opening 35 one sixteenth of an inch in diameter when using a one-to-one mixture of light machine oil and kerosene. This dimension, of course, may vary with variation in conditions, such as the viscosity of the oil and the differential pressure condition between points 12 and 14 in conduit 10.

If for any reason the pressure in conduit 10 at point 14 should momentarily become greater than the pressure at point 12, reverse flow will occur through device 18, and the oil in gage glass 30 below the lower end of tube 34 forced upwardly through the latter into chamber 44 to displace a corresponding amount of the raw water therefrom and force the displaced water upwardly through connection 16. The capacity of chamber 44 is such as to insure that a sufficient volume of raw water is available in chamber 44 for such displacement by the oil to allow sufficient time for pressure conditions to be restored to normal before oil begins to discharge upwardly through inlet connection 16. The upper portion of tube 34 extending upwardly beyond the lower open end of connection 16, it will be seen, provides a trap arrangement to prevent loss of the oil under conditions just referred to.

In the system shown in Fig. 3, a coagulant such as a saturated alum solution, is displaced from the tank 51 by way of outlet connection 52 corresponding to outlet connection 22—15 in Fig. 1, and is then discharged into the conduit 53 leading to a suitable filter. In putting this apparatus into service, valves 54 and 55 are closed, and petcocks 56 and 56a opened. When the tank has drained, petcock 56a is closed. The tank is then filled to the top with lump alum by way of an opening normally closed by a suitable cover plate 57. After plate 57 has been replaced, water is admitted to the tank by opening valve 54. The petcock 56 is closed when water begins to discharge therefrom upon filling of the tank. The indicating device 59 is identical in construction and principle of operation to device 18 in Fig. 1, and is put into service in the same manner as the latter. In this system, the small, proportional amount of the raw water shunted from conduit 53 filters through the lump alum in tank 51 and becomes saturated with alum. The raw water entering the tank at a rate depending upon the adjustment of valves 54 and 60, displaces an equal volume of the saturated alum solution and forces the same into conduit 53 by way of connection 52.

In lieu of the arrangement or connection shown in Figs. 1 and 3 in which the indicating device is disposed in and forms part of the inlet connection to the chemical-feed tank, the device may be disposed in and form part of the outlet connection, as shown in Fig. 4, in which the connection 61 corresponds to the outlet connection 15 in Fig. 1 or the outlet connection 52 in Fig. 3. In the arrangement in Fig. 4, therefore, the chemical solution displaced from the chemical-feed tank will pass through the indicating device and can be observed as it issues from the lower end of tube 34 in the form of drops or globules and passes downwardly through the oil or other liquid having such chemical and physical characteristics as to make the drops or globules of the chemical perceptible to the eye and which will not react with or be affected by the chemical to make the same ineffective for this purpose.

While the present disclosure is presented as being a practical embodiment of my invention, it will be appreciated that various changes might be made, such as in the size, shape and arrangement of the parts without departing from the spirit of the invention or the scope of the claims.

The invention claimed is:

1. In apparatus of the character described, a casing having a chamber at one end thereof, an inlet connection at said end of the casing, and means in said casing providing a partition between said inlet connection and the other end of said casing, said partitioning means provided with a passage permitting of liquid-flow through the same and with a vent opening independent of such passage.

2. In apparatus of the character described, a casing having a chamber at one end thereof, an inlet connection at said end of the casing, means in said casing providing a partition between said inlet connection and the other end of said casing, a tube associated with said partitioning means and providing a passage for liquid through the same, said tube extending in a direction toward and beyond the adjacent end of said inlet connection.

3. In apparatus of the character described, a casing having a chamber at one end thereof, an inlet connection at said end of the casing, means in said casing providing a partition between said inlet connection and the other end of said casing, and a tube open at both ends thereof and extending through said partitioning means and beyond both sides of the latter.

4. In apparatus of the character described, a casing having a chamber at one end thereof, an inlet connection at said end of the casing, means in said casing providing a partition between said inlet connection and the other end of said casing, and a tube open at both ends thereof and extending through said partitioning means and beyond both sides of the latter, said partitioning means provided with a vent opening.

5. In apparatus of the character described, a casing having a chamber at one end thereof, an inlet connection at said end of the casing, means in said casing providing a partition between said inlet connection and the other end of said casing, and a tube open at both ends thereof and extending through said partitioning means and beyond both sides of the latter, the end of said inlet connection and the adjacent end of said tube extending beyond each other.

6. A device of the character described comprising a chamber having transparent wall structure and normally containing a displaceable liquid and a substantially constant volume of a second liquid dissimilar in appearance and specific gravity, a second chamber, and a tube effecting communication between said chambers and terminating in said first chamber within said second liquid whereby feed of liquid from said second chamber to the displaceable liquid of said first chamber is visible, said second chamber having a volume between its inlet and the inlet of said tube somewhat greater than the volume of said second liquid to prevent loss thereof in event of reverse flow through the device.

7. A device of the character described comprising a chamber normally containing a displacing liquid and having an inlet for supply thereof, a second chamber having transparent wall structure and normally containing a displaceable liquid and a substantially constant volume of a third liquid of dissimilar appearance and specific gravity, and means having openings in said first and second chambers for permitting flow of said displacing liquid from said first chamber to said second chamber, the opening in said second chamber being disposed to ensure visibility of the flow of said displacing liquid to said second liquid through said third liquid, and the opening in said first chamber being so disposed relative to said inlet thereof that the volume between them is somewhat greater than the volume of said second liquid to prevent loss thereof upon reversal of flow through said device.

AUSTIN C. DRESHER.